US006454299B2

(12) United States Patent
Whang et al.

(10) Patent No.: US 6,454,299 B2
(45) Date of Patent: Sep. 24, 2002

(54) AIRBAG DEVICE

(75) Inventors: David Whang, Bloomfield Hills, MI (US); Yuichi Nanbu, Tokyo (JP); David McCormick, St. Clair Shores, MI (US)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/829,000

(22) Filed: Apr. 10, 2001

Related U.S. Application Data

(60) Provisional application No. 60/197,771, filed on Apr. 14, 2000.

(51) Int. Cl.[7] ................................................ B60R 21/26
(52) U.S. Cl. ....................................... 280/736; 280/741
(58) Field of Search ................................ 280/736, 741, 280/740; 102/530, 531

(56) References Cited

U.S. PATENT DOCUMENTS 3,972,545 A * 8/1976 Kirchoff et al.
4,578,247 A * 3/1986 Bolieau
5,100,171 A * 3/1992 Faigle et al.
5,116,080 A * 5/1992 Wipasuramonton
5,186,491 A * 2/1993 Yoshida et al.
5,269,561 A * 12/1993 Davis et al.
5,345,875 A * 9/1994 Anderson
5,431,103 A * 7/1995 Hock et al.
5,582,427 A * 12/1996 Rink et al.
5,799,973 A * 9/1998 Bauer et al.

* cited by examiner

*Primary Examiner*—Paul N. Dickson
*Assistant Examiner*—Tony Winner
(74) *Attorney, Agent, or Firm*—Foley & Lardner

(57) ABSTRACT

An air bag device with improved initial restraining capability includes an inflator that provides for shortening the starting time for rising the pressure of an airbag and also the time required for the pressure to reach the maximum value. The inflator includes a propellant, an igniter for igniting the propellant, a combustion chamber in which the propellant is burned, a filter chamber in which a filter is accommodated, a partition separating the combustion chamber and the filter chamber, communication orifices formed in the partition for allowing the communication between the combustion chamber and the filter chamber, and gas ports for supplying inflating gas into an airbag, and further comprises aluminum films which are broken and open the communication orifices at a predetermined pressure inside the combustion chamber and air-tightly close the communication orifices until the pressure reaches the predetermined pressure.

6 Claims, 4 Drawing Sheets

100
10
1f
4
11
1a
5
2
1d
3
7
6
11a
1b
1e

AIRBAG DEVICE

CROSS REFERENCE TO RELATED APPLICATIONS

The present application claims priority to and the benefit of U.S. Provisional Patent Application Serial No. 60/197,771 filed Apr. 14, 2000. The foregoing provisional application is incorporated by reference herein in its entirety.

BACKGROUND OF THE INVENTION

The present invention relates to an airbag device having an inflator which generates gas for inflating and deploying an airbag. More particularly, the invention relates to a device having an inflator of a type that a combustion chamber and a filter chamber are separately provided.

Regardless of the type of airbags (e.g. driver airbags, front-passenger airbags, side impact airbags, and curtain airbags), conventional pyrotechnic inflators generally fall into the following two types: a type wherein the propellant and a filter are housed in one chamber (for example, a one-chamber type as disclosed in WO9908907); and a type where these components are housed in respective separate chambers (for example, a two-chamber type as disclosed in DE29819168U1). That is, the one-chamber type inflator has one chamber in which propellant and a filter are housed. The two-chamber type inflator comprises a combustion chamber in which propellant is filled, a filter chamber in which a filter is housed, and a partition provided between the combustion chamber and the filter chamber wherein the partition is formed with a hole for allowing the communication between the combustion chamber and the filter chamber from the initiation of combustion until the combustion pressure reaches the maximum value. The combustion gas starts to flow into the filter chamber at the initiation of combustion. This inflow of gas causes a little delay to rise the combustion pressure to the maximum value. Further, the delay slows the speed of combustion.

It is desired to shorten the starting timing of rising the inner pressure of an airbag and to shorten the time period required from the start of rising of the inner pressure until the inner pressure reaches the maximum value, for improving the initial restraining capability of an airbag device.

It is desired to provide an inflator which has an increased degree of freedom of design for positioning a gas port.

It is desired to provide an inflator which provides for an increased degree of freedom of design for easily changing its profile to be suitable for any housing space.

SUMMARY OF THE INVENTION

In order to solve the above-described problems, an inflator of the present invention comprises: a propellant, an igniter for igniting the propellant, a combustion chamber in which the propellant is burned, a filter chamber in which a filter is accommodated, a partition separating the combustion chamber and the filter chamber, communication orifices formed in the partition for allowing the communication between the combustion chamber and the filter chamber, and gas ports for supplying inflating gas into an airbag, and further comprising a closing mechanism which provides for an air tight closure at the communication orifices until the inner pressure of the combustion chamber reaches a predetermined pressure.

According to this structure, the combustion chamber is closed so that the pressure in the combustion chamber rises quickly. The closing mechanism releases when the pressure reaches the predetermined pressure, thereby reducing the delay in the start of rising the inner pressure of an airbag, shortening the time period required from the start of rising of the inner pressure until the inner pressure reaches the maximum value, and thus improving the initial restraining capability of an airbag device.

The inflator of the present invention is characterized in that the closing mechanism breakable members which can be broken at the predetermined pressure. According to this structure, inexpensive breakable members such as aluminum film can be employed as the closing mechanism or means.

The inflator of the present invention is further characterized in that the predetermined pressure is slightly lower than the maximum combustion pressure of the propellant in the combustion chamber. According to this structure, the reliability of releasing action of the closing mechanism can be improved because the action is not affected by variation in the maximum combustion pressure due to individual differences of the propellant.

The inflator of the present invention is characterized in that the predetermined pressure is a value around the lower limit of a variation range of the maximum combustion pressure. According to this structure, the reliability of releasing action of the closing mechanism can be improved because the action is not affected by variation in the maximum combustion pressure due to individual differences of the propellant.

An airbag device according to the present invention may include: a propellant, an igniter for igniting the propellant, a combustion chamber in which the propellant is burned, a filter chamber in which a filter is accommodated, a partition separating the combustion chamber and the filter chamber, communication orifices formed in the partition for allowing communication between the combustion chamber and the filter chamber, and gas ports for supplying inflating gas into an airbag, and is characterized in that the gas ports can be formed at any places in the outer periphery of the inflator, except a portion adjacent to the combustion chamber.

According to this structure, the gas ports may be formed in almost all outer periphery adjacent to the filter chamber, thus increasing the degree of freedom of design for positioning gas ports. In addition, the filter can be used as heat-absorbing mechanism through its entire surface, thus improving the endothermic effect of the filter.

An airbag device of the present invention is characterized by comprising an airbag connected to the aforementioned inflator. According to this structure, an airbag device can be obtained which has excellent rising characteristics of the inner pressure of the airbag.

The airbag device of the present invention is characterized in that the airbag has a gas inlet facing to the gas ports of the aforementioned inflator. According to this structure, the gas inlet of the airbag is disposed to face to the gas ports so as to cope with multidirectional or bidirectional gas spouted out simultaneously from the gas ports of the inflator of this type, thereby effectively introducing the inflating gas of the inflator of this type into the airbag. This structure can speed up the initial deployment of the airbag or can deploy multiple areas of airbags at once.

In an alternative embodiment, an inflator of the present invention may comprise: a propellant, an igniter for igniting the propellant, a combustion chamber in which the propellant is burned, a filter chamber in which a filter is positioned, a partition separating the combustion chamber and the filter chamber, communication orifices formed in the partition for allowing the communication between the combustion chamber and the filter chamber, and gas ports for supplying inflating gas into an airbag, and wherein the combustion chamber and the filter chamber are arranged in parallel in the longitudinal direction with the partition being interposed therebetween.

According to this structure, the inflator can be made to be short in the longitudinal direction and thin in the thickness so that the inflator can be suitably used in such a case to be housed in a limited space such as an A-pillar, a B-pillar, a C-pillar, and a space behind a garnish. By arranging the combustion chamber and the filter chamber to be offset in parallel or making the filter chamber longer than the combustion chamber in the longitudinal direction, the projecting portion of the filter chamber can be effectively used as a connecting portion with the airbag. Ends of the projecting portion can be provided with gas ports.

An airbag device of the present invention is characterized by comprising an airbag which can be connected to the connecting portion of the aforementioned inflator. According to this structure, a curtain airbag device or a side impact airbag device can be obtained which has excellent rising characteristics of the inner pressure of the airbag.

In another alternative embodiment, the inflator of the present invention is characterized in that the filter chamber has projecting portions on both ends thereof in the longitudinal direction so that the filter chamber is longer than the combustion chamber, and further has connecting portions formed on the ends of the projecting portions which can be connected to the airbag. According to this structure, since gas can be supplied to the airbag through gas ports facing in directions opposite to each other, the deployment of the airbag can be started at two locations at the same time, thus speeding up the deployment of the airbag. It is effective for deploying an airbag having a wide areas such as a curtain airbag. An airbag device of the present invention may include an airbag which can be connected to the connecting portions of the aforementioned inflator.

According to this structure, a curtain airbag device can be obtained which has excellent rising characteristics of the inner pressure of the airbag. Since gas spouted out in the opposite directions can be effectively introduced into the airbag at the same time i.e. bidirectional gas can be supplied simultaneously into the airbag, the gas can quickly fill the entire airbag, thus speeding up the deployment of the airbag.

In yet another alternative embodiment, the inflator of the present invention is characterized in that the filter chamber and the combustion chamber are arranged to be offset from each other in the longitudinal direction with the partition being interposed therebetween so that the filter chamber and the combustion chamber project in the opposite directions to each other, and further has a connecting portion formed on the end of the projecting portion of the filter chamber. According to this structure, when this inflator is used for a curtain airbag, for example, the inflator has advantages that it can be made shorter than a conventional inflator and that the projecting portion can be used as a connecting portion with the airbag. It is especially advantageous in a case that the inflator is connected to the curtain airbag around the A-pillar, the B-pillar, or the C-pillar.

An airbag device of the present invention includes an airbag which can be connected to the connecting portion of the aforementioned inflator. According to this structure, a curtain airbag device can be obtained which has excellent rising characteristics of the inner pressure of the airbag and of which inflator can be housed in a long curved limited space such as a A-pillar and a C-pillar.

In an alternative embodiment, an inflator of the present invention may comprise: a propellant, an igniter for igniting the propellant, a combustion chamber in which the propellant is burned, a filter chamber in which a filter is positioned, a partition separating the combustion chamber and the filter chamber, communication orifices formed in the partition for allowing communication between the combustion chamber and the filter chamber, and gas ports for supplying inflating gas into an airbag, and is characterized in that the filter is substantially formed in a thick disk-like configuration wherein one surface of the filter is arranged adjacent to the combustion chamber via the partition.

According to this structure, since the gas ports can be formed in the top surface in addition to the side surface of the inflator, the airbag can be controlled to be deployed in a desired condition (for instance, a front portion of the airbag is deployed prior to the other portion). It is especially advantageous in a case that the inflator is used for a driver airbag. An airbag device of the present invention may include an airbag connected to the aforementioned inflator. According to this structure, a driver airbag device can be obtained which has excellent rising characteristics of the inner pressure of the airbag. Since the gas ports can be formed in the top surface in addition to the side surface of the inflator, a driver airbag device can be obtained in which a front portion of the airbag can be initially deployed by gas spouted out through the gas ports of the top surface so that it is suitable for early restraint.

In yet another alternative embodiment, an inflator of the present invention may comprise: a propellant, an igniter for igniting the propellant, a combustion chamber in which the propellant is burned, a filter chamber in which a filter is positioned, a partition separating the combustion chamber and the filter chamber, communication orifices formed in the partition for allowing the communication between the combustion chamber and the filter chamber, and gas ports for supplying inflating gas into an airbag, and is characterized in that the filter is substantially formed in a hollow cylindrical configuration and the combustion chamber is formed in the hollow portion of the filter via the partition.

According to this structure, this inflator can be employed as an inflator for a front passenger airbag. Therefore, an inflator for a front passenger airbag can be obtained which can provide excellent rising characteristics of inner pressure of the airbag. In case that the inflator is used for a front passenger airbag, the gas ports can be positioned at any places in a wide side surface and portions of ends of the cylindrical portion, thereby increasing the degree of freedom of design for positioning gas ports.

An airbag device of the present invention may include an airbag connected to the aforementioned inflator.

According to this structure, a front passenger airbag device can be obtained which has excellent rising characteristics of the inner pressure of the airbag. The airbag device is suitable for a curtain airbag, a side impact airbag, a front-passenger airbag, or a driver airbag, of which profile is compact, which has an increased degree of freedom of design for positioning a gas port and setting the flow of gas.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 1(A)–1(C) show the structure of a first embodiment of an inflator according to the present invention wherein FIG. 1(A) is an exploded perspective view, FIG. 1(B) is a perspective sectional view taken along A—A of FIG. (A), and FIG. 1(C) is a partially enlarged view of a range circled in FIG. 1(B).

FIGS. 4(A), 4(B) show a fourth embodiment of the inflator according to the present invention wherein FIG. 4(A) is a sectional view taken along B—B of FIG. 4(B) and FIG. 4(B) is a perspective view showing the contour of the inflator of this embodiment.

FIGS. 5(A), 5(B) show a fifth embodiment of the inflator according to the present invention wherein FIG. 5(A) is a perspective view showing the contour of the inflator of this embodiment for use of a front passenger airbag and FIG. 5(B) is a sectional view taken along C—C of FIG. 5 (A).

DETAILED DESCRIPTION

Hereinafter, embodiments of the present invention will be described with reference to the attached drawings. It should be understood that the sizes, shapes, positional relation of respective components are schematically shown just for understanding the invention and that the numerical conditions stated in the following are just illustrative examples.

Figure 1A:
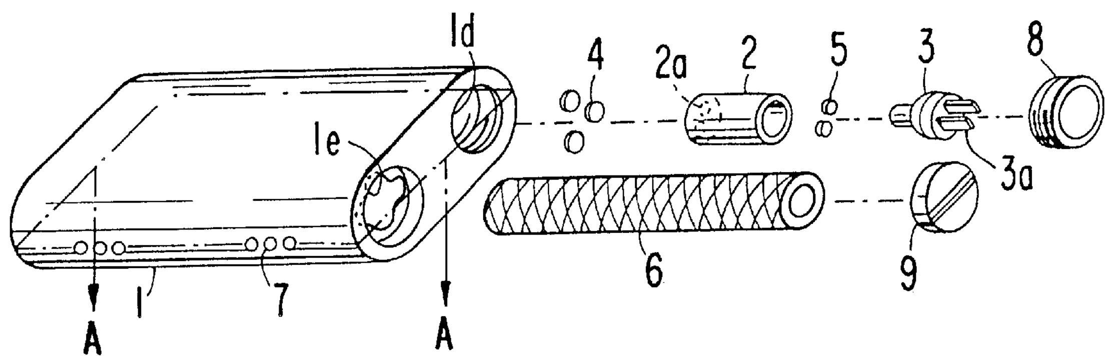
Figure 1C:
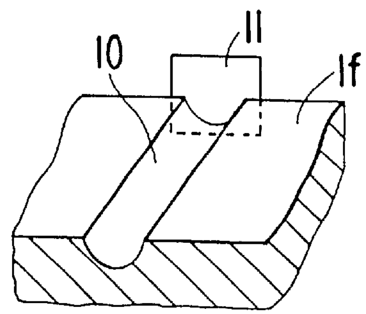
Figure 1B:
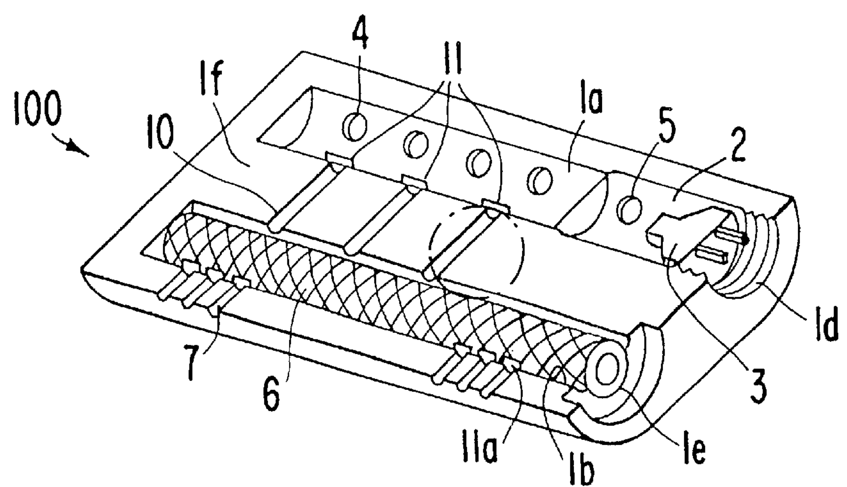

FIGS. 1 (A)–1(C) show the structure of a first embodiment of an inflator according to the present invention wherein FIG. 1(A) is an exploded perspective view, FIG. 1(B) is a perspective sectional view taken along A—A of FIG. 1(A), and FIG. 1(C) is a partially enlarged view of a range circled in FIG. 1(B).

An inflator 100 of this embodiment is of a type for use of a curtain airbag and is formed in a thin box-like configuration. The inflator may include the following components:

1) a body 1 composing a casing of the inflator 100;

2) a propellant combustion chamber 1*a* formed inside the body 1;

3) a propellant opening 1*d* formed in one side surface of the body 1 to be connected to the propellant combustion chamber 1*a;*

4) a filter chamber 1*b* formed inside the body 1;

5) a filter opening 1*e* formed in the side surface of the body to be connected to the filter chamber 1*b;*

6) a partition 1*f* for separating the propellant combustion chamber 1*a* and the filter chamber 1*b* from each other;

7) a plurality of first orifices formed in the partition 1*f* to allow the communication between the propellant combustion chamber 1*a* and the filter chamber 1*b;*

8) first shims 11 for air-tightly closing the first orifices 10, respectively;

9) a booster 2 in which booster propellant 5 is filled and which is sealed by an initiator 3;

10) propellant 4 disposed in the propellant combustion chamber 1*a;*

11) a filter 6 disposed in the filter chamber 1*b;*

12) a plurality of second orifices 7 formed in one side surface of the body 1;

13) second shims 11*a* for air-tightly closing the openings of the second orifices 7;

14) a fixing ring 8 to be threaded in the propellant opening 1*b* for sealing and fixing the propellant 4 and the booster 2; and 15) a cap 9 for covering the filter opening 1*e* in which the filter 6 is inserted.

The detail of the inflator of this embodiment will now be described with reference to FIGS. 1(A)–1(C).

The body 1 is made by molding the contour of the body 1, drilling or forming the propellant combustion chamber 1*a* and the filter chamber 1*b*, drilling or forming the first orifices 10 in the partition if from through an outside wall of the body 1 and the propellant combustion chamber 1*a* wherein drilled holes in the outside wall of the body 1 should be filled by filler, and drilling or forming the second orifices 7 in another outside wall of the body 1. The closing mechanism may include first shims 11 (see FIG. 1(C)) for air-tightly closing the first orifices 10 are breakable members as closing mechanism or means, e.g. aluminum films. The first shims 11 are attached to the openings of the first orifices 10 by, for example, heat-resisting adhesives. The strength and the thickness of the first shims 11 are selected that the first shims 11 break at a time when the combustion pressure in the propellant combustion chamber 1*a* reaches a predetermined pressure. Ideally, the predetermined pressure in this case is the maximum combustion pressure of the propellant. However, since the maximum combustion pressure may vary due to individual differences of the propellant and the strength of the aluminum films may also vary due to individual differences of the aluminum films, the predetermined pressure should be set slightly lower than the maximum combustion pressure. It should be noted that the closing mechanism are not limited to the breakable members and may be any mechanism, means or device capable of opening the orifices according to the predetermined pressure. For example, electric opening mechanism which senses the predetermined pressure by a sensor and opens the first orifices 10 may be employed as the closing mechanism. The breakable members may include shims and may be made of other metal such as copper and iron besides aluminum which can be broken at the predetermined pressure.

The second shims 11*a* air-tightly closing the second orifices 7 are for example aluminum films and are attached to the openings of the second orifices 7 by for example heat-resisting adhesives. Since the main purpose of the second shims 7 is to seal the second orifices 7 for preventing water and/or foreign matters from entering into the filter chamber 1*b,* the strength and the thickness of the second shims 11*a* are set in such a manner that the second shims 11 are broken at such slight combustion pressure as not to delay the timing of inflating gas sporting through the second orifices 7.

Disposed at a lower end of the initiator 3 is a terminal 3*a* which is connected to an airbag harness not shown.

Hereinafter, the actions of the inflator of this embodiment will be described. As the terminal 3*a* receives an ignition signal of the airbag at the event of a vehicle collision, the initiator 3 is triggered to ignite the propellant 5 so that high-temperature gas spouts out of orifices 2*a* formed in the booster 2 into the propellant combustion chamber 1*a*. Accordingly, the propellant 4 in the propellant combustion chamber 1*a* is ignited to generate gas for inflating the airbag. Since the first orifices 10 are closed by the first shims 11, the inflating gas is prevented from flowing out of the propellant combustion chamber 1*a* so that the pressure in the propellant combustion chamber 1*a* is risen earlier as compared to the conventional one. As the pressure in the propellant combustion chamber 1*a* reaches the predetermined pressure (preferably, slightly lower than the maximum combustion pressure, and most preferably a value around the lower limit of a variation range of the maximum combustion pressure), the first shims 11 are broken so that the inflating gas spouts into the filter chamber 1*b* through the first orifices 10. The second shims 11*a* are immediately broken so that the inflating gas spouts into the airbag through the second orifices 7. In this case, since the second shims 11*a* can be broken at slight combustion pressure, the second shims 11*a* block little the spout of the inflating gas.

Since the actions of other embodiments are the same as those of this embodiment, the description about the actions of the other embodiment can be understood as discussed above. In addition, the description of parts similar or corresponding to the parts of this embodiment applies to the embodiments discussed below.

Figure 2:
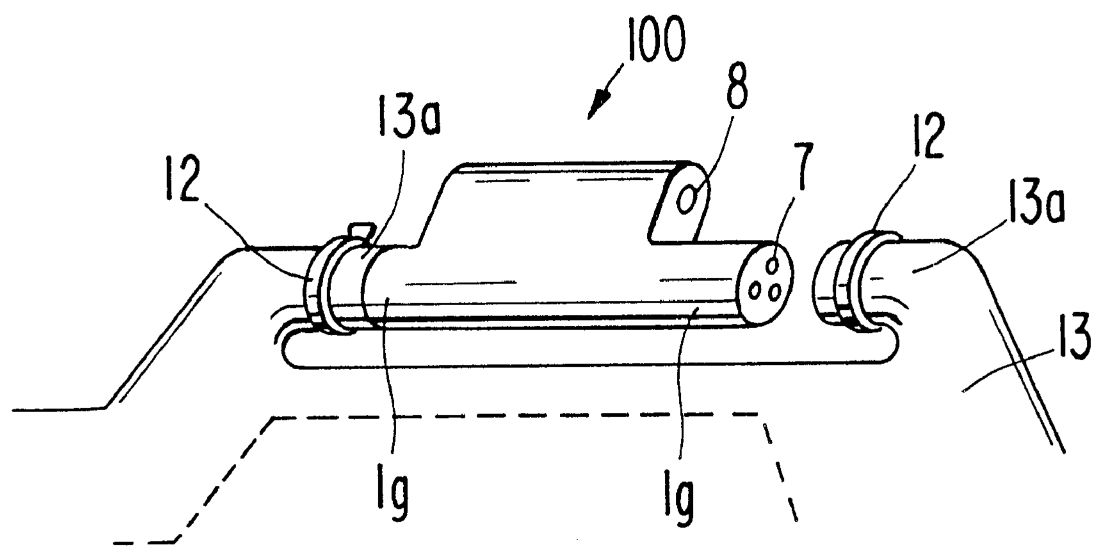
FIG. 2 is a view showing a second embodiment of the inflator according to the present invention.

FIG. 2 is a view showing a second embodiment of the inflator according to the present invention, illustrating a case where the inflator of this embodiment is connected to a central portion (B-pillar) of a curtain airbag.

An inflator 100 of this embodiment is of a type for use of a curtain airbag. The inflator 100 of this embodiment is different from that of the first embodiment because the portion of the body 1 covering the filter chamber 1*b* projects in the right and left directions to be longer than the portion of the body 1 covering the propellant combustion chamber 1*a*. In addition, the second orifices 7 are formed in the ends of two projecting portions. Both ends of the filter chamber 1*b* are extended in the longitudinal direction such that the both ends project from the propellant combustion chamber 1*a* to form cylindrical projecting portions 1*g*. The second orifices 7 are formed in the ends of the projecting portions 1*g*. The projecting portions 1*g* are inserted into connecting portions 13*a* of a curtain airbag 13 as shown in FIG. 2 and are fastened by bands 12 to provide an air-tight connection.

According to this structure of the inflator, the length of the inflator can be shortened in the longitudinal direction and the thickness of the inflator can also be reduced. Therefore, the inflator 100 can be connected to the airbag 13 structured as shown in FIG. 2 around the B-pillar and can be compactly accommodated behind a garnish around the B-pillar. Gas spouts are provided to inflate the airbag 13 through the two connecting portions 13*a,* thereby efficiently deploying the airbag 13 and thus speeding up the initial deployment of the airbag.

Figure 3:
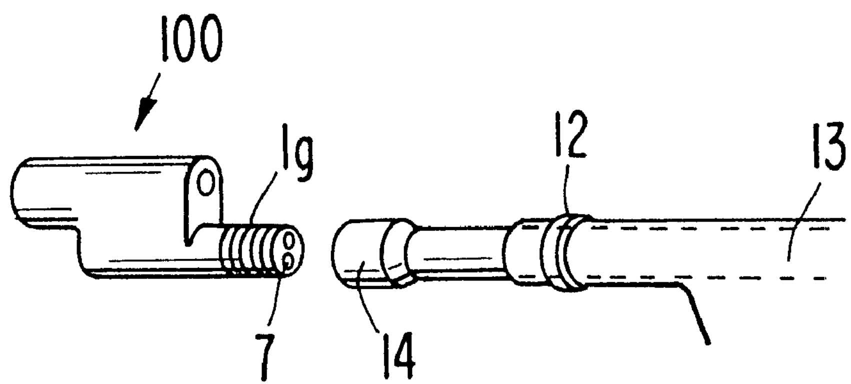
FIG. 3 is a view showing a third embodiment of the inflator according to the present invention.

FIG. 3 is a view showing a third embodiment of the inflator according to the present invention, illustrating a case that the inflator of this embodiment is connected to a curtain airbag around a A-pillar or a C-pillar.

An inflator 100 of this embodiment is of a type for use of a curtain airbag. The inflator 100 of this embodiment is different from that of the first embodiment because the portion of the body 1 covering the propellant combustion chamber 1*a* and the portion of the body 1 covering the filter chamber 1*b* are arranged to be offset from each other in the longitudinal direction as shown in FIG. 3. An end portion (projecting portion 1*g* in FIG. 3) of the range covering the filter chamber 1*b* is formed in a cylindrical configuration to have such a size as to be connected to a pipe 14 of the airbag 13, and the second orifices 7 are formed in the end thereof.

As structured above, the length and the width of the inflator can be adjusted to desired values just by changing the shifting length.

According the structure of the inflator, for example in a case shown in FIG. 3, the length and the width of the inflator can be freely set to have such a size and configuration as to be accommodated in the A-pillar or the C-pillar.

Figure 4A:
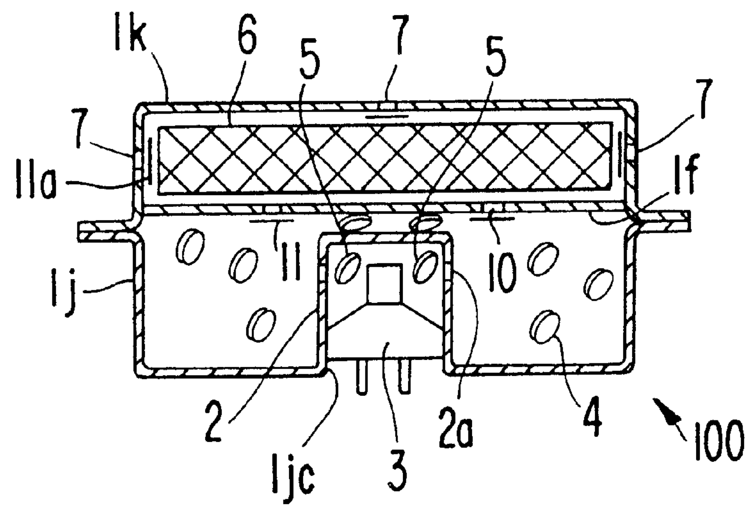
Figure 4B:
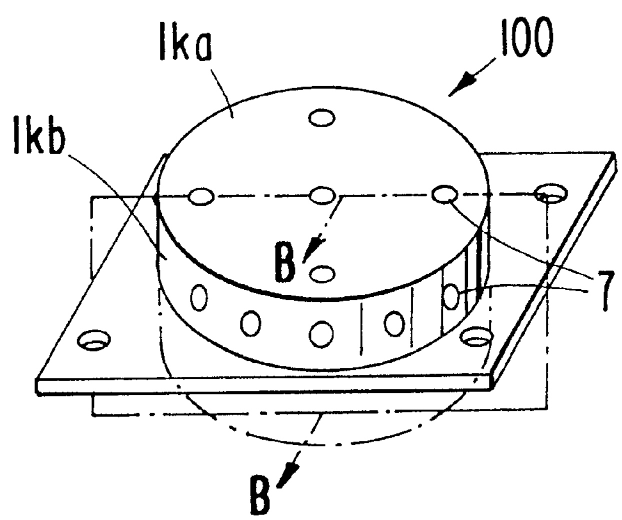

FIGS. 4(A), 4(B) show a fourth embodiment of the inflator according to the present invention wherein FIG. 4(A) is a sectional view taken along B—B of FIG. 4(B) and FIG. 4(B) is a perspective view showing the contour of the inflator of this embodiment.

An inflator 100 of this embodiment is of a type for use of a driver airbag. In this embodiment, a body 1 comprises an upper body 1*k* defining the filter chamber 1*b* and a lower body 1*j* defining a propellant combustion chamber 1*a* which are structured to be fitted to each other as shown in FIG. 4(A). As shown in FIG. 4(B), second orifices 7 are formed in a side surface 1*kb* and a top surface 1*ka* of the upper body 1*k* as shown in FIG. 4(B). Each second shim 11*a* is air-tightly attached to each of the second orifices 7 from the inside. A thick disk-like filter 6 is disposed inside of the upper body 1*k* for covering the inside of the upper body 1 and a disk-like partition 1*f* is air-tightly fixed by welding to close the upper body 1*k*. The partition 1*f* is formed with first orifices 10. All of openings of the first orifices 10 facing the lower body 1*j* are air-tightly closed with first shims 11. The lower body 1*j* is formed with a hole 1*jc* at a central portion thereof for the attachment of a booster 2. The booster 2 is fixed to the hole 1*jc* by welding to provide an air-tight connection. Inside the booster 2, a booster propellant 5 and an initiator 3 are disposed. Further, a propellant 4 is disposed inside the lower body 1*j* to surround the booster 2. The upper body 1*k* and the lower body 1*j* structured as described above are fitted and connected to each other air-tightly by welding. The other details of the structure are substantially similar those of the first embodiment.

According to the structure of the inflator, the second orifices 7 can be formed freely at any places of the side surface 1*kb* and the top surface 1*ka* of the upper body 1*k*. Therefore, for example, it can be possible to form the gas ports in the top surface 1*ka* as shown in FIG. 4(B) that was impossible in prior art, thereby increasing the degree of freedom of design for positioning the second orifices 7.

Figure 5A:
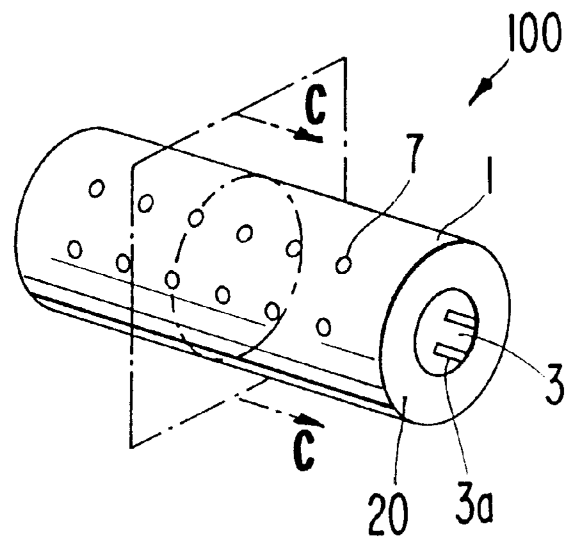
Figure 5B:
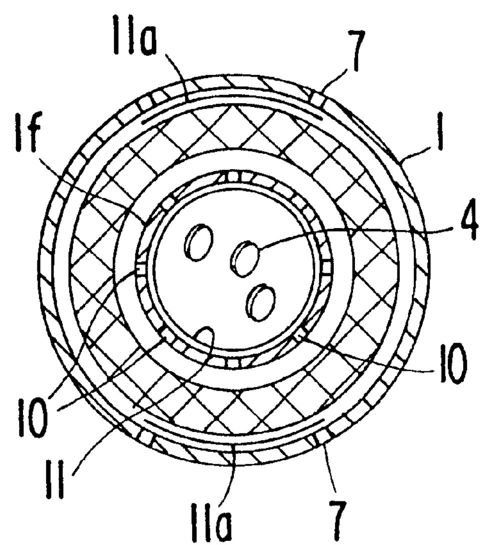

FIGS. 5(A), 5(B) show a fifth embodiment of the inflator according to the present invention wherein FIG. 5(A) is a perspective view showing the contour of the inflator of this embodiment for use of a front passenger airbag and FIG. 5(B) is a sectional view taken along C—C of FIG. 5(A).

An inflator 100 of this embodiment comprises, as shown in FIG. 5(B), a cylindrical body 1 of which one end is open and the other end is closed. A partition 1*f* is provided for separating the inside of the body 1 into a filter chamber 1*b* and a propellant combustion chamber 1*a,* a tubular filter 6 having such a size as to be just fitted to the filter chamber 1*b* is fitted into the filter chamber 1*b.* A propellant 4 is stored in the propellant combustion chamber 1*a.* A booster 2 is disposed to seal the propellant combustion chamber 1*a.* A lid 20 is provided for air-tightly sealing the filter chamber 1*b* and fixing the booster 2. The partition 1*f* is formed with first orifices 10 of which openings are attached with and air-tightly closed by first shims 11 from the inside. The side surface of the cylindrical body 1 is formed with second orifices 7 of which openings are attached and air-tightly closed by second shims 11*a* from the inside. Inside of the booster 2, a booster propellant 5 and an initiator 3 are air-tightly accommodated. The other details of the structure are the same as those of the fourth embodiment.

According to the aforementioned structure of the inflator, the second orifices 7 can be formed freely at any places of the side surface of the inflator 100 for the use of the front passenger airbag, thereby increasing the degree of freedom of design for positioning the second orifices 7.

It should be understood that the present invention is not limited to the aforementioned embodiments and can be applied to another inflator for a side impact airbag, a knee-protecting airbag, or a foot-protecting airbag.

Though the embodiments are described by using the inflator having one filter and one combustion chamber, the present invention is not limited thereto and the inflator may have a plurality of filters and/or a plurality of combustion chambers.

As described above, the airbag device of the present invention has an inflator which is provided with a closing mechanism at communication orifices of a partition separating a combustion chamber and a filter chamber which can be broken at a predetermined pressure and air-tightly close the communication orifices until the pressure reaches the predetermined pressure so that the gas pressure in the combustion chamber is risen quickly and the combustion in the combustion chamber is speeded up, thereby shortening the starting timing of rising the inner pressure of an airbag and shortening the time period required from the start of rising of the inner pressure until the inner pressure reaches the maximum value. Therefore, the present invention can provide an airbag device having excellent rising characteristics of the inner pressure of the airbag, i.e. excellent initial restraining capability.

Since a filter is disposed to cover an inner surface not facing the partition of the filter chamber, an area covered by the filter is increased, thereby increasing the degree of freedom of design for positioning gas ports.

Since the combustion chamber and the filter chamber are arranged in parallel in the longitudinal direction with the partition being interposed therebetween, the inflator can be made to be short in the longitudinal direction and thin in the thickness. Therefore, the present invention can provide an airbag device comprising an inflator having an increased degree of freedom of design for easily changing its profile to be suitable for any housing space.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device having an elongated inflator comprising:

a propellant;

an igniter for igniting the propellant;

a combustion chamber in which the propellant is burned;

a filter chamber in which a filter is positioned;

a partition separating said combustion chamber and said filter chamber;

communication orifices formed in said partition for allowing communication between said combustion chamber and said filter chamber, wherein said combustion chamber and said filter chamber are arranged in parallel in the longitudinal direction of the inflator with said partition being interposed therebetween; and gas ports for supplying inflating gas into an airbag wherein said filter chamber and said combustion chamber are arranged to be offset from each other in the longitudinal direction with the partition being interposed therebetween so that said filter chamber and said combustion chamber project in the opposite directions to each other, and wherein the inflator further comprises a connecting portion formed on the end of a projecting portion of said filter chamber.

2. The device of claim 1, further comprising an airbag connected to the inflator.

3. An airbag device having an elongated inflator comprising:

a propellant;

an igniter for igniting the propellant;

a combustion chamber in which the propellant is burned;

a filter chamber in which a filter is positioned;

a partition separating said combustion chamber and said filter chamber;

communication orifices formed in said partition for allowing communication between said combustion chamber and said filter chamber, wherein said combustion chamber and said filter chamber are arranged in parallel in the longitudinal direction of the inflator with said partition being interposed therebetween; and gas ports for supplying inflating gas into an airbag wherein said filter chamber has two ends includes projecting portions on both ends thereof in the longitudinal direction so that said filter chamber is longer than said combustion chamber, and wherein connecting portions are formed on the ends of said projecting portions for connecting to the airbag.

4. The airbag device of claim 3, further comprising an airbag connected to the connecting portions of the inflator.

5. An airbag device having an elongated inflator comprising:

a combustion chamber and a filter chamber;

a partition separating said combustion chamber and said filter chamber;

wherein said filter chamber and said combustion chamber are arranged to be offset from each other in the longitudinal direction with a partition being interposed therebetween so that said filter chamber and said combustion chamber project in the opposite directions to each other, and wherein the inflator further comprises a connecting portion formed on the end of a projecting portion of said filter chamber.

6. An airbag device having an elongated inflator comprising:

a combustion chamber and a filter chamber, wherein said combustion chamber and said filter chamber are arranged in parallel in the longitudinal direction of the inflator with a partition being interposed therebetween; and gas ports for supplying inflating gas into an airbag wherein the filter chamber has two ends and includes projecting portions on both ends thereof in the longitudinal direction so that said filter chamber is longer than said combustion chamber, and wherein connecting portions are formed on the ends of said projecting portions for connecting to the airbag.

* * * * *